June 7, 1932.  H. M. SCOTT  1,861,721
CHEESE TREATING METHOD AND APPARATUS
Filed Aug. 9, 1929  2 Sheets-Sheet 1

INVENTOR.
Henry Murray Scott
BY
Wheeler, Wheeler & Wheeler
ATTORNEYS

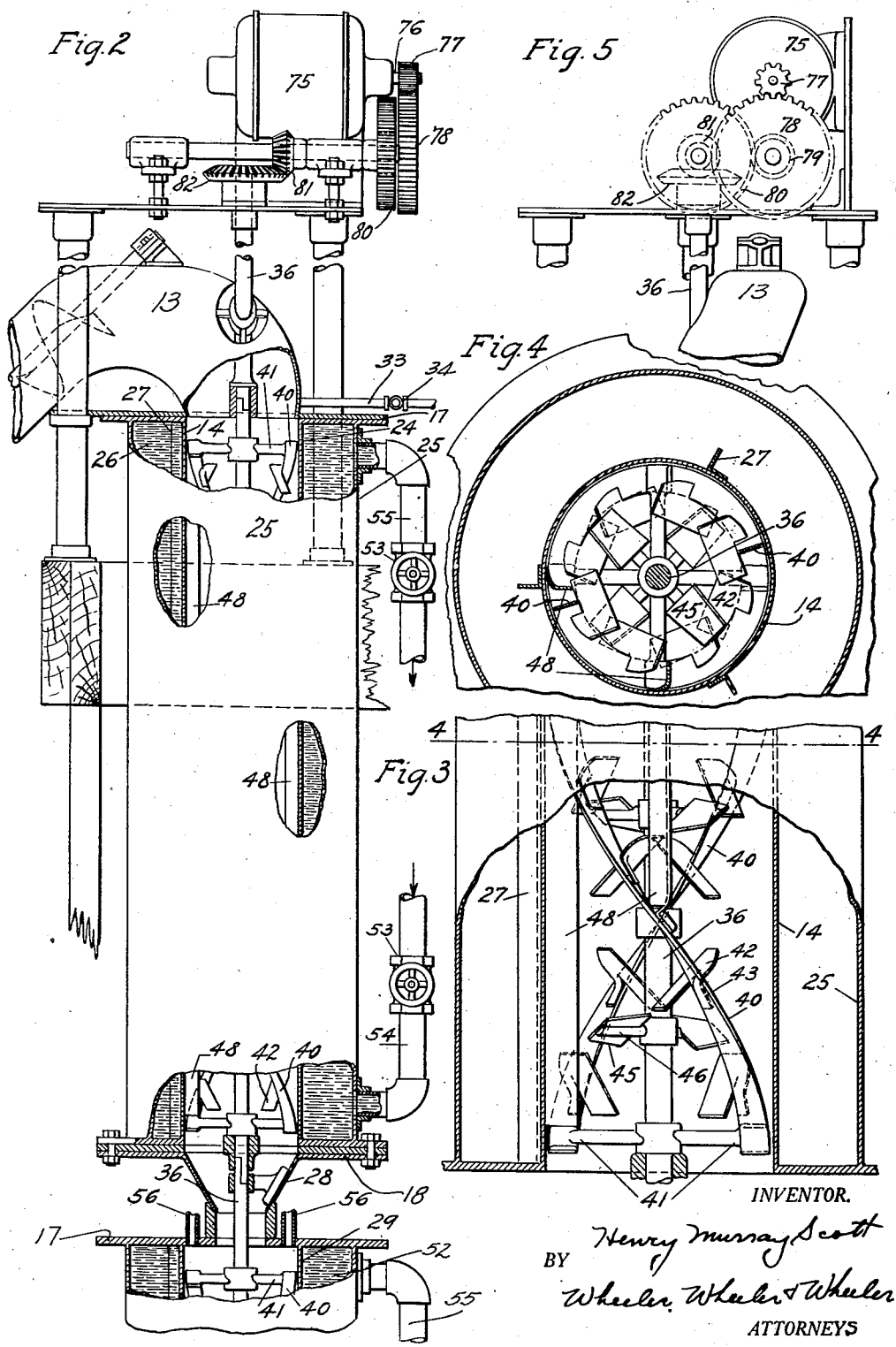

Patented June 7, 1932

1,861,721

UNITED STATES PATENT OFFICE

HENRY MURRAY SCOTT, OF SWEETWATER, TENNESSEE

CHEESE TREATING METHOD AND APPARATUS

Application filed August 9, 1929. Serial No. 384,578.

My invention relates to improvements in cheese treating methods and apparatus with particular reference to the manufacture of what is commercially known as processed cheese. Such cheese is made from quantities of previously manufactured cheese selected for blending purposes with reference to age, variety, quality, etc., to be mixed, re-melted and re-packaged for commercial sale.

In the manufacture of processed cheese, two methods have been employed which are respectively known as the batch or kettle method, and the continuous or conveyor method. By the batch or kettle method a predetermined quantity or batch of cheese is placed in a kettle having a steam receiving jacket, agitated and heated until melted, whereupon the contents are removed and another batch is substituted.

By the continuous or conveyor method the cheese is advanced, preferably by a mutilated screw conveyor and progressively heated while being so advanced, whereby a continuous stream of cheese fragments may be fed into the conveyor trough or chamber at one end, while a constant delivery of melted cheese is taking place at the other end. In the practice of the continuous method it has been found possible to avoid the baking effects incident to the contact of cheese with the hot wall of a kettle by directing jets of steam against the cheese while it is being advanced and agitated by the conveyor and by allowing the steam to freely escape. A large number of heat units may be delivered to the cheese quickly and by allowing the condensing steam to escape freely, objectionable increases of the water content of the cheese may be largely avoided under proper conditions of room temperature and cheese temperature. Such use of steam for continuously heating a stream of cheese is disclosed in former Patents No. 1,523,678, dated January 20, 1925, and No. 1,639,828, dated August 23, 1927.

But under varying conditions of atmospheric humidity it is difficult to avoid varying degrees of moisture in the product and at times it is found difficult to hold the moisture content from becoming objectionably excessive. In the effort to find means for controlling the moisture content and holding it within limits recognized as satisfactory and required by legislation in some States, I have discovered that baking upon the walls of a container may be avoided if the cheese is kept in continuous motion and if the advance of the more highly heated portions are accelerated relatively to the other portions, some of the less heated portions being not only retarded, but their flow reversed when out of contact with heated surfaces.

I have discovered that it is possible to heat a continuously flowing stream of cheese either by transfer of heat through the walls of a passage or by the direct action of steam within the passage, or by both methods, if all of the cheese is kept in continuous motion wherever it contacts with the walls of the passage, and if gravital pressure against such walls is reduced to a minimum.

I have also discovered that the tendency to bake upon the walls of a passage may be reduced if such walls are progressively heated in a certain definite proportion to the desired heat of the cheese in the different stages of its progress through the passage.

In accordance with these discoveries it is my object to provide means for progressively heating a descending stream of cheese (preferably a vertically descending stream) in association with means for progressively applying external heat and transmitting it through the walls of a passage within which the flowing stream of cheese is confined. It is also my object to provide means for relatively accelerating those portions of the stream of cheese to which the heat units are most rapidly delivered and progressively retarding or reversing the flow of the less highly heated portions or of the more slowly heating portions whereby continuous agitation may be maintained within the stream and the various portions thereof intermingled and blended and heat distribution by convection accelerated.

It is also my object to provide suitable apparatus to facilitate carrying out my improved process whereby the same may be expedited and mechanically carried on with minimum labor and production cost.

It is also my object to provide means for mixing and melting cheese in successive stages during each of which the cheese may be subjected to the direct action of steam if desired, and during each of which the cheese may be also heated by conducton through the walls of a passage within which it is confined and along which passage it is advanced by gravity with its rate of movement regulated by conveying mechanism so that the rate of advance is more rapid in the peripheral portions of the stream than in the central portions, the cheese being constantly mixed and blended in such a manner that it may be delivered at the end of the passage in a homogeneous condition.

It is a further object of my invention to provide a succession of passages within each of which the cheese may be heated as above described but in which it may be subjected successively to higher degrees of heat in successive passages or passage sections whereby the heat of the wall of the passage may be kept more nearly at a uniform temperature in excess of the heat of the cheese thereby maintaining a definite temperature drop between the source of heat and the cheese to which the heat is being transferred.

It is also an object of my invention to provide means for not only limiting the moisture absorption by the cheese during the heating thereof but for entirely avoiding moisture absorption in some or all stages of the heating process whenever it appears desirable to do so, and to also regulate the moisture content according to pre-determined plan.

In the drawings:

Figure 2 is an enlarged view, in side elevation, of the initial blending and heating chamber, with parts broken away to show the interior and also showing a fragment of a receiving chamber which may be assumed to be of similar construction.

Figure 3 is an enlarged fragmentary view, in vertical section, showing the lower portion of the initial heating chamber illustrated in Figure 2.

Figure 4 is a horizontal sectional view drawn to line 4—4 of Figure 3.

Figure 5 is a view of the motor and driving connections, taken at right angles to Figure 2 and showing fragments of the mixer shaft, conveyor tube and supporting posts.

Like parts are identified by the same reference characters throughout the several views.

Figure 1:
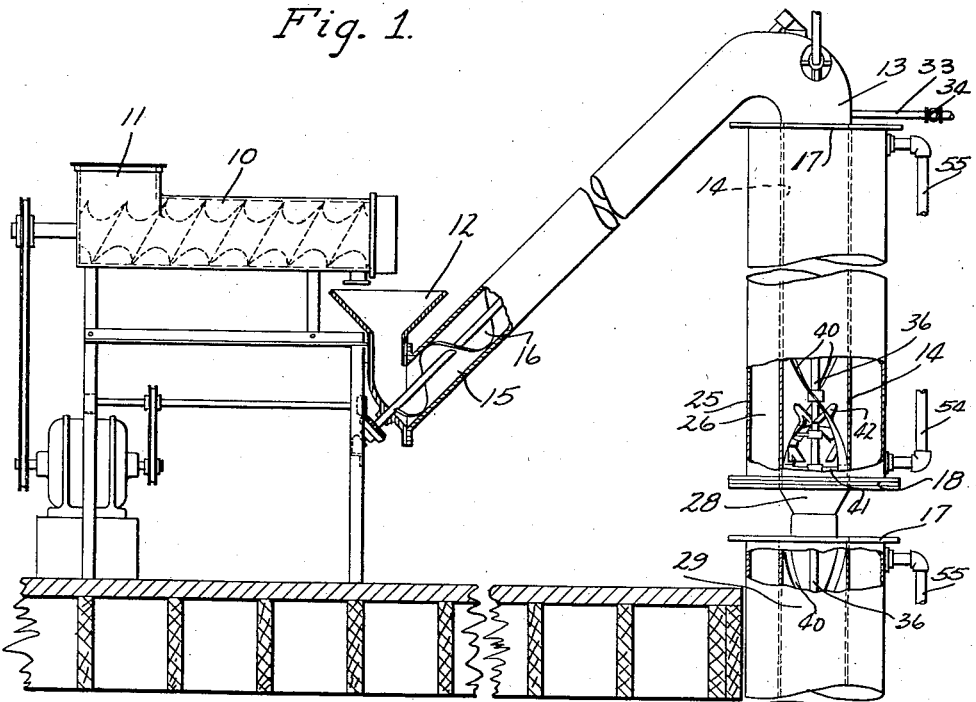
Figure 1 is a conventional illustration in side elevation of cheese processing apparatus embodying my invention, with portions broken away to show the interior structure.

By my improved process the cheese will first be finely divided, preferably by passing it through a so-called cheese grinder, various types of which are in commercial use and one of which is conventionally illustrated at 10 in Figure 1. This grinder receives the cheese through a hopper 11 and it may also receive flavoring material through another hopper 12. The cheese is delivered from this grinder in fragments, ribbons, or thread like streams, and is fed into the receiving end 13 of a vertical tubular passage 14, preferably by means of an elevator 15 having therein a screw conveyor 16.

The elevator 15 will of course be used only in cases where the installation is such that the cheese is ground at a lower level than the point of delivery into the melting passage. Otherwise the cheese may be delivered from the grinder directly into portion 18 of the melting passage.

After the cheese has been so ground and delivered it is passed through a heated zone which may or may not contain free steam but in which heat is being continuously supplied in such a manner as to rapidly raise the temperature of the cheese.

While passing through this zone the cheese is not only heated but is continuously mixed and blended, the solid portions being broken and also liquefied, both by absorption of additional heat units and by distribution of heat (convection) from the more completely melted portions. Heat units may be conveniently transmitted by conduction through passage walls as well as by steam jets arranged to deliver steam directly to the cheese. Where steam is used, much of the heat transmitted to the cheese is latent in the steam and is given up as the steam condenses.

By allowing the cheese to descend vertically and controlling its movement by the means employed for agitating, mixing and blending it, the various particles are prevented from massing before becoming liquefied and this not only facilitates distribution of heat through the cheese but also permits greater freedom of escape for the steam and the elimination of some moisture by evaporation, the vapor passing upwardly and escaping at the top of the passage.

Preferably the cheese is subsequently passed through another heated zone of similar character, the temperature of which is higher than that in the receiving zone. The number of such zones will, of course, depend upon the degree of heat added to the cheese in each zone or stage but, regardless of the number of zones or the length thereof, a sufficient number of heat units will be imparted to the cheese so that in the final stage of the process the cheese is reduced to a homogeneous liquid or semi-liquid mass capable of flowing by gravity into containers within which it may be packaged for commercial sale.

Further describing my improved process with reference to the apparatus shown in the drawings, and disregarding the grinder 10 and the elevator 15, these structures being no part of the invention claimed herein, it may be assumed that comminuted cheese is fed by any suitable means into the portion 13 of the vertical passage 14 through which it tends to drop by gravity. It will be observed that this passage 14 is jacketed, the same having an outer wall 25 which forms a jacket cavity 26 closed at the ends by end walls or flanges 17 and 18 respectively. The wall 14 is preferably reinforced by angle iron bars 27 which do not subdivide the jacket cavity but merely operate as supports for the wall of the cheese passage.

If desired the cheese may be passed from the cylinder or cylinder passage 14 through a hopper shaped outlet 28 at the bottom thereof and into another vertically disposed cylinder 29 which is similarly constructed but which may be differently heated or heated to a different degree. The use of a plurality of cylinders is not essential to my invention since the degree of heat imparted to the cheese will depend upon the temperature of the heating fluid, the length and the diameter of the cylinder and if desired the entire operation may be performed in a single cylinder of suitable length and diameter to enable the cheese to be melted. After the cheese has been melted, either in one cylinder or in a plurality of cylinders, it will be delivered into suitable boxes or containers into which it may be allowed to flow by gravity, the flow being controlled by a valve 30 to allow boxes or containers 31 to be successively filled as they are fed along a packaging table or runway 32.

If it is desired to add to the moisture content of the cheese and to increase the rapidity of the melting operation, steam may be injected into the upper portion of the passage or into contact with the cheese as it passes through the portion 13 thereof, a steam pipe 33 being indicated in Fig. 2 for that purpose. This pipe is provided with a valve 34 whereby the supply of steam may be shut off or its flow regulated.

A shaft 36 extends vertically along the longitudinal center line of the superheating chambers or cylinders 14 and 29. A set of ribbon-like flow controlling blades 40, each supported at intervals from the shaft by radial arms 41, is provided within each of the cylinders or heating chambers. The blades 40 have a steeply pitched, helical curve and the shaft is revolved in a direction to cause the blades to operate as conveyors to carry the cheese downwardly in the cylinder in a controlled movement or rate of travel instead of allowing it to fall freely through the cylinder by gravity. The outer margin of each blade revolves in close proximity to the wall of the cylinder and between the blade and the shaft 36, oppositely pitched plowing baffles 42 are disposed in positions to lift the cheese.

Each baffle is comparatively short and widely spaced from the next, and as each tends to lift the cheese with which it comes in contact, it is effective for mixing and also for lateral distribution. The baffles 42 preferably have a portion partially severed and bent to form a supporting bracket 42 which is welded or otherwise secured to the conveyor ribbon 40.

Co-operative plowing baffles 45 are supported on arms 46 projecting radially from the shaft 36. These baffles preferably comprise flat plates, the side margins of which taper toward the outer ends. While they co-operate with the baffles 42, they act upon the cheese even more closely to the shaft, and their action is somewhat different from the baffles 42 in that they tend more strongly to press the cheese away from the shaft and thus promote interchange of particles with those of higher temperature which flow inwardly from the vicinity of the cylinder wall.

Scraping blades 48 may be used, although they are not essential. As shown, they extend vertically along the wall of the cylinder, their upper and lower ends being connected with the ribbon conveyor members 40 or with their supporting arms 41. These blades comprise substantially flat strips of material, the outer margins of which are slightly curved in a position to plow or scrape the cylinder wall free of cheese tending to collect thereon and to direct such cheese toward the central portion of the passage formed by the cylinder. These blades may have a length equal to the distance from one radial arm 41 to the next one directly above or below it and each blade therefore spans the space between two conveyor ribbons 41. The next scraping blade 48 will preferably be located on the opposite side of the cylinder in a position to scrape cheese from the next vertically adjacent portion of the cylinder wall.

The co-operative action of the ribbons 41, baffles 42, and 45 and blades 48, is such that portions of the cheese will be constantly pressed downwardly in the annular zone occupied by the ribbons 40, while other portions between the ribbons and the shaft will be constantly lifted by the baffles and also forced outwardly between the ribbons by the resistance of the superposed masses. Still other portions will be moved inwardly toward the shaft by the blades 48 if such blades are used. In this manner the more highly heated outer portions will be moved downwardly toward the outlet and also toward the center and all portions will be thoroughly mixed and blended while the temperature is being raised very gradually in proportion to the rate of downward travel.

The temperature of the heating fluid in the jacket cavity 26 will, of course, be above the temperature of the cheese delivered into that cylinder, but the difference in temperature need not be sufficient to cause a baking of cheese particles upon the wall of that cylinder under the conditions of movement and agitation therein. The constant downward flow of the mass of cheese assists very materially in preventing any particles from coming to rest and baking in fixed contact with a given portion of the cylinder wall. Therefore, it is obvious that the conditions are radically different from those existing in a kettle, wherein particles of cheese may be at rest or substantially so in the intervals when they are not being directly moved by the paddles or agitating device. In my improved heater the downward motion is continuous for the entire body of cheese except only for those portions which are engaged and temporarily lifted by the baffles.

As above stated, the baffles are operative in the central portion of the column of cheese between the shaft and the helical ribbons 40. Therefore, the tendency will be to establish an upwardly moving stream at the center within a downwardly moving annular or cylindrical stream of cheese, the latter being not only carried down by gravity but by the ribbon blades 40 which control the movement so that the cheese between the successive blades will move downwardly at a rate determined by the speed of rotation and the pitch of the blades.

The cheese is sufficiently viscous to prevent it from flowing with any great degree of rapidity along the helical path defined by the blades or ribbons and the construction at the lower end of the cylinder also retards the tendency of the cheese to flow by gravity and allows the cylinder to become filled with cheese to a point near the top of the cylinder when the rate of in-feeding is substantially equal to the rate at which the cheese flows through the outlet 28.

The lower superheating chamber 29 may be a duplicate of the one above described and the shaft 36 may be extended vertically through both cylinders where conditions permit a complete alignment of the cylinders 24 and 29 with each other. The mixing equipment of the lower chamber will be like that in the upper chamber, and it is, therefore, deemed unnecessary to duplicate either the illustration or the description. But ordinarily the fluid in the jacket cavities will have different temperatures, the temperature of the fluid in the jacket cavity 52 of the second superheater being preferably at a higher temperature than that in the jacket cavity of the first superheater. The heating fluid (water or steam) may be derived from the same source of supply, and the temperature controlled by means of valves 53, both the inlet and the outlet ducts 54 and 55 being preferably provided with such valves. Steam may be permitted to escape from the upper cylinder along the shaft 36 or otherwise, and either cylinder may have its upper end provided with steam escape outlets or vents 56, as shown at 29 whereby to allow for the evaporation in whole or in part, of the moisture in the cheese or any moisture that may have been added by an initial steam treating or pre-warming treatment.

By delivering the heating fluid to the bottom portion of the jacket and allowing it to return through pipe 55 from the top of the jacket, a progressive increase in temperature is maintained from the top to the bottom of the cylinder. Water is preferably used in the jackets because its mass assists in maintaining temperatures sufficiently accurate for the requirements of cheese manufacture.

Figure 6:
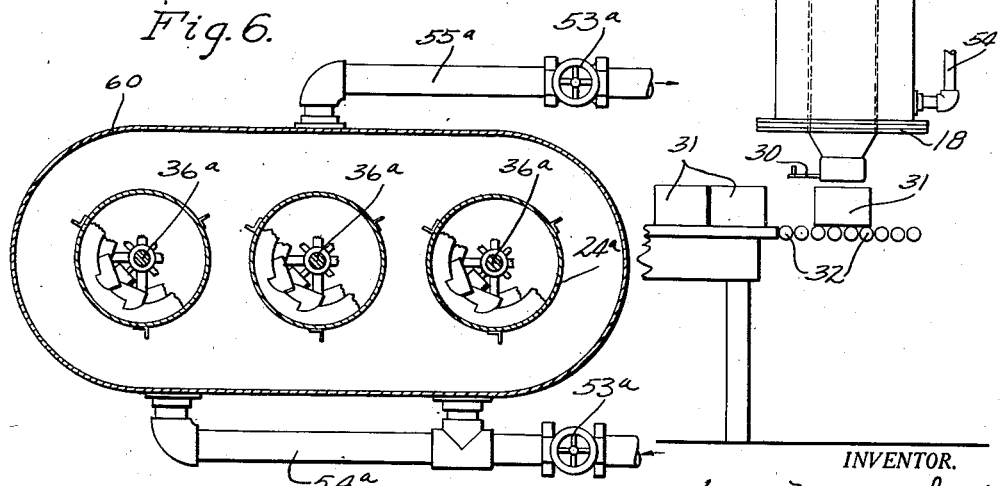
Figure 6 is a plan view of a modified form of construction in which a single fluid-containing jacket is associated with a series of parallel heating cylinders.

Referring to Figure 6 it will be observed that a single oval jacket 60 contains a plurality of cylinders 24a which may be assumed to contain agitating and feeding means similar to that employed in the cylinders 14 above described. By thus mounting a block of heating cylinders within a single heating jacket, the capacity of the machine may be greatly increased. It will, of course, be understood that if superposed cylinders are employed as disclosed in Figure 2 the lower block of cylinders will be similar to the upper one shown in Figure 6.

I claim:

1. Cheese treating apparatus, comprising the combination of a vertically disposed receiving chamber having an open lower end and means for feeding cheese into its upper end in finely divided form, said chamber being provided with downwardly feeding means, upwardly feeding means and inwardly feeding means, each means co-operative with the others for mixing and regulating the flow of the cheese through the chamber, and a jacket for said chamber, spaced therefrom and provided with valved connections for delivering heating fluid therethrough.

2. Apparatus for treating cheese, comprising the combination with means for feeding cheese in subdivided form of a series of vertically disposed heating cylinders arranged with the upper cylinder in a position to receive cheese from the feeding means, said cylinders being open at their lower ends, and means for passing cheese through said chambers successively and in a continuously moving and continually agitated stream, said means including means for preventing the cheese from adhering to or baking upon the cylinder walls and means for independently regulating the heat of the respective cylinders, including heating jackets for said cylinders having jacket cavities independently supplied with heating fluid.

3. Apparatus for treating cheese comprising the combination of a vertically disposed cylinder having open upper and lower ends and encircled by an intermediate steam receiving jacket, a rotary mixer within said chamber provided with helical blades having their outer margins in close proximity to the cylinder wall and their inner margins spaced at a substantial distance from the central axis of the cylinder, an actuating shaft extending vertically along said cylinder axis and connected with the blades, and obliquely disposed plow baffles connected with said shaft and blades respectively, and pitched in a direction opposite the pitch of the portion of the blades with which they are associated, said baffles being adapted to serve as lifting plows to move cheese in the central portion of the cylinder upwardly when the shaft and blades are rotated in a direction to cause the blades to force the cheese downwardly along the inner surface of the wall of the cylinder.

4. Apparatus for treating cheese comprising the combination of a vertically disposed cylinder having open upper and lower ends and encircled by an intermediate steam receiving jacket, a rotary mixer within said chamber provided with helical blades having their outer margins in close proximity to the cylinder wall and their inner margins spaced at a substantial distance from the central axis of the cylinder, an actuating shaft extending vertically along said cylinder axis and connected with the blades, a set of lifting plows disposed transversely across the inner margins of the blades and secured thereto, another set of lifting plows having radial arms connected with the shaft and means for rotating the shaft blades and plows in a direction to drive cheese downwardly along the inner surface of the cylinder wall while intermittently lifting it with a plowing action in the space between the blades and the shaft.

5. Cheese treating apparatus comprising the combination of means for subdividing cheese, an open ended vertically disposed cylinder adapted to receive cheese from the subdividing apparatus and allow it to move by gravity continuously through the cylinder, and means within the cylinder for moving the cheese downwardly along the wall thereof while relatively retarding its movement in the central portions of the cylinder and plowing it in a direction to cause it to move upwardly and toward the wall of the cylinder for acceleration in the direction of the outlet end of the cylinder.

6. Apparatus for treating cheese comprising the combination with a vertically disposed cylinder having open upper and lower ends and through which the cheese may flow continuously, of means for feeding finely divided cheese into the upper end of the cylinder and a rotary mixer within the cylinder provided with narrow helical blades extending along the interior surface of the cylinder, co-operating scraper blades adapted to direct the cheese inwardly from the wall of the cylinder, and obliquely disposed plowing baffles having a pitch opposite that of the blades and disposed for movement between the blades and the axis of the cylinder, and means for rotating said mixer in a direction to cause the blades to move the cheese downwardly and the plowing baffles to move the cheese upwardly to effect in co-operation with the scraping blades a continuous lateral interchange of particles of cheese adjacent the wall of the cylinder with those in proximity to the axis, and means for heating the cheese during its passage through the cylinder.

HENRY MURRAY SCOTT.